US005651062A

United States Patent [19]

Fukuda

[11] Patent Number: 5,651,062
[45] Date of Patent: Jul. 22, 1997

[54] AUTOMATIC PRIVATE BRANCH EXCHANGE APPARATUS

[75] Inventor: Hitoshi Fukuda, Fukuoka, Japan

[73] Assignee: Matsushita Electric Industrial Co., Ltd., Japan

[21] Appl. No.: 498,480

[22] Filed: Jul. 5, 1995

[30] Foreign Application Priority Data

Jul. 11, 1994 [JP] Japan .................................. 6-158613

[51] Int. Cl.$^6$ ...................................................... H04M 3/00
[52] U.S. Cl. ........................ 379/309; 379/265; 379/234
[58] Field of Search ................................. 379/67, 69, 88, 379/207, 216, 247, 265, 266, 309, 232, 234

[56] References Cited

U.S. PATENT DOCUMENTS

| 4,599,493 | 7/1986 | Cave ......................................... 379/247 |
| 4,866,758 | 9/1989 | Heinzelmann ............................. 379/247 |
| 5,185,742 | 2/1993 | Bales et al. ................................ 370/110.1 |
| 5,463,685 | 10/1995 | Gaeschter et al. ........................ 379/207 |

FOREIGN PATENT DOCUMENTS 4-304054  10/1992  Japan .

*Primary Examiner*—Krista M. Zele
*Assistant Examiner*—Daniel S. Hunter
*Attorney, Agent, or Firm*—Rossi & Associates

[57] ABSTRACT

An automatic private branch exchange apparatus controls connection between office lines and extension lines, respectively. The apparatus executes automatic calling to the office lines based on stored telephone number data in the telemarketing or the like. When, for example, one of the office lines responds to the calling, that is, a called party offhooks a telephone handset, the apparatus automatically selects one of the available extension lines and sends a ring sound request signal into the selected extension line. When the selected extension line responds, that is, an off-hook signal is sent through this extension line, the apparatus establishes connection between these responded extension and office lines.

33 Claims, 5 Drawing Sheets

AUTOMATIC PRIVATE BRANCH EXCHANGE APPARATUS

BACKGROUND OF THE INVENTION

1. Field of the Invention

The present invention relates to an automatic private branch exchange apparatus.

2. Description of the Prior Art

Hereinbelow, one type of conventional automatic private branch telephone exchange apparatus will be described with reference to FIGS. 4 and 5.

FIG. 4 is a block diagram showing a conventional automatic private branch telephone exchange apparatus having a casing 1. In the figure, broken lines represent sound communication lines, while solid lines represent control data lines, respectively.

In FIG. 4, numeral 16 denotes a main control section for controlling switching operations, such as, connection between extension lines 15a to 15c and office lines 8a to 8d, respectively, and between the extension lines mutually. Numeral 17 denotes a main storage section for storing data including managing data of the extension lines and the office lines and system managing data.

Symbol 2a denotes an office line control section connected to the office line 8a for communicating with the office line 8a. The office line control section 2a includes a communication passage control section 4 connected to the office line 8a for establishing a communication passage to carry a sound signal, such as, a voice signal, from the office line 8a to a communication passage switching section 9 when communicating with one of the extension or intercommunication lines 15a to 15c. The office line control section 2a further includes a dial signal sending section 3 which, in response to a dialing command from the main control section 16, generates and sends out a dial signal into the office line 8a via the communication passage control section 4. The office line control section 2a further includes a ring signal detecting section 5 for detecting a ring signal sent from a telephone exchange through the office line 8a and through the communication passage control section 4 upon occurrence of a call from a calling party and for notifying the main control section 16 of arrival of the call. The office line control section 2a further includes a response detecting section 6 for detecting a polarity inversion of the office line 8a which is indicative of an occurrence of response by a called party, that is, offhooking of a telephone handset at a side of the called party, and for notifying the main control section 16 of the response by the called party. The office line control section 2a further includes a termination-of-communication detecting section 7 for detecting a termination-of-communication signal formed by a DC hit (short break) signal indicative of a termination of communication at the side of a counter-party, that is, on-hooking of the telephone handset at the side of the counter-party, and sent from the telephone exchange through the office line 8a and through the communication passage control section 4 and for notifying the main control section 16 of the termination of communication.

Symbols 2b, 2c and 2d represent office line control sections connected to the office lines 8b, 8c and 8d, respectively. Each of the office line control sections 2b, 2c and 2d has the same structure as the foregoing office line control section 2a. Although only the four office line control sections 2a to 2d are shown for brevity of disclosure, further office line control sections are provided in practice.

Symbol 10a denotes an extension line control section connected to the extension line 15a for communicating with the extension line 15a. The extension line control section 10a includes a communication passage control section 12 connected to the extension line 15a for establishing a communication passage to carry a sound signal, such as, a voice signal, from the extension line 15a to the communication passage switching section 9 when communicating with one of the office lines 8a to 8d. The extension line control section 10a further includes a ring sound request sending section 11 for sending a ring sound request signal, as commanded by the main control section 16 upon occurrence of a call to the extension line 15a, into the extension line 15a via the communication passage control section 12. The extension line control section 10a further includes a dial signal receiving section 13 for detecting a dial signal sent from an extension telephone set (not shown) connected to the extension line 15a through the communication passage control section 12 and for notifying the main control section 16 of the detected dial signal. The extension line control section 10a further includes an on/off-hook detecting section 14 for monitoring an off-hook signal sent from the extension telephone set through the communication passage control section 12 so as to notify the main control section 16 of on/off-hook information.

Symbols 10b and 10c represent extension line control sections connected to extension lines 15b and 15c, respectively. Each of the extension line control sections 10b and 10c has the same structure as the foregoing extension line control section 10a. Although only the three extension line control sections 10a to 10c are shown for brevity of disclosure, further extension line control sections are provided in practice.

The communication passage switching section 9 achieves connection, under the control of the main control section 16, between the extension line control sections 10a to 10c and the office line control sections 2a to 2d, respectively, and between the extension line control sections mutually.

An operation of the conventional private branch telephone exchange apparatus having the foregoing structure will be described hereinbelow, wherein a call is made from the extension telephone set connected to the extension line to a called party through the office line.

When, for example, an operator offhooks the extension telephone set connected to the extension line 15a, the on/off-hook detecting section 14 of the extension line control section 10a receives an off-hook signal and notifies it to the main control section 16. In response to this notification, the main control section 16 is set ready to receive a dial signal from the dial signal receiving section 13 of the extension line control section 10a.

Thereafter, when the operator inputs dialing data, the main control section 16 receives the corresponding dial signal from the dial signal receiving section 13 of the extension line control section 10a and identifies the received dial signal. The main control section 16, then, monitors the office line control sections 2a to 2d so as to detect one which is vacant, that is, not used. It is assumed that the office line control section 2a is vacant. Subsequently, the main control section 16 sends the dialing data to the dial signal sending section 3 of the detected office line control section 2a. In response to receipt of the dialing data, the dial signal sending section 3 executes calling to the office line 8a based on the received dialing data, that is, produces the dial signal based on the received dialing data and sends it out into the office line 8a.

Now, the operation of the main control section 16 when performing the calling through the office lines will be described in further detail with reference to a state transition diagram shown in FIG. 5.

Initially, the main control section 16 is in an extension-line stand-by state (20) for awaiting the off-hook signal from any of the on/off-hook detecting sections 14 of the extension line control sections 10a to 10c.

When the off-hook notification (21) is received from any of the on/off-hook detecting sections 14, the main control section 16 shifts to a dial-tone state (22) for sending a dial tone to the corresponding extension telephone set through the extension line. During the dial-tone state (22), when the on-hook notification (23) is received from the on/off-hook detecting section 14, the main control section 16 returns to the extension-line stand-by state (20).

On the other hand, when the dial signal (24) Is received, during the dial-tone state (22), from the dial signal receiving section 13, the main control section 16 monitors the office line control sections 2a to 2d so as to detect one which is vacant, that not used. It is assumed that the office line control section 2a is vacant.

Subsequently, the main control section 16 controls the office line control section 2a to catch the corresponding office line 8a (25), that is, to close a direct current loop to connect the office line 8a, so that the main control section 16 shifts to a calling state (27) where the calling is executed to the office line 8a.

On the other hand, when none of the office lines 8a to 8d are caught (26), that is, none of the office line control sections 2a to 2d are available, the main control section 16 shifts to a busy-tone state (31) for sending a busy tone to the extension telephone set via the extension line 15a.

During the calling state (27) or the busy-tone state (31), when the on-hook notification (28) or (32) is received from the on/off-hook detecting section 14, the main control section 16 returns to the extension-line stand-by state (20). On the other hand, during the calling state (27), when the dial signal (30) is fully sent to and received by the telephone exchange and further when a line response (29) occurs, that is, when the office line 8a is Inverted in polarity, the main control section 16 shifts to a communication state (33) for establishing a communication between the extension line 15a and the office line 8a.

Recently, companies have been putting great importance on the telemarketing. The telemarketing is, in general, performed through telephone based on a customer list in the form of a data base, for example, the Introduction of merchandise, the telephone research for election and the like. In the telemarketing, some operators make calls In sequence according to the customer list of the data base.

However, when the telemarketing is performed using the foregoing conventional private branch exchange apparatus, each operator should also perform those things other than conversation with the called party, including, such as, dialing, waiting, judging whether the called party is in communication with another or whether the called party is absent, and the like. Accordingly, a time is largely required for other than conversation with the called party so as to lower the efficiency of the telemarketing. Particularly, when the called party does not offhook the telephone handset, such as, when the called party is absent, the operator has to judge absence of the called party after hearing ring back tones several times so that the efficiency of the telemarketing is seriously lowered.

SUMMARY OF THE INVENTION

Therefore, it is an object of the present invention to provide an Improved automatic private branch exchange apparatus which requires substantially no time of an operator other than conversation with a called party so as to improve efficiency of, for example, telemarketing.

According to one aspect of the present invention, a private branch telephone exchange apparatus comprises an office line control section for controlling an office line; a communication passage switching section for connecting between the office line and an extension line; and a main control section for controlling said office line control section so as to perform automatic calling to the office line based on stored telephone numbers, the main control section, when the office line control section detects a signal indicative of a response to the calling sent through the office line, controlling the communication passage switching section to connect between the office line and the extension line.

According to another aspect of the present invention, a private branch telephone exchange apparatus comprises office line control sections for controlling office lines, respectively; a communication passage switching section for connecting between one of the office lines and an extension line; and a main control section for controlling the office line control sections so as to perform automatic calling to the office lines based on stored telephone numbers, the main control section, when at least one of the office line control sections detects a signal indicative of a response to the calling sent through the corresponding office line, controlling the communication passage switching section to connect between the responded office line and the extension line.

According to another aspect of the present invention, a private branch telephone exchange apparatus comprises office line control sections for controlling office lines, respectively; extension line control sections for controlling extension lines, respectively; a communication passage switching section for connecting between the office lines and the extension lines, respectively; and a main control section for controlling the office line control sections so as to perform automatic calling to the office lines based on stored telephone numbers, the main control section, when at least one of the office line control sections detects a signal indicative of a response to the calling sent through the corresponding office line, controlling the communication passage switching section to connect between the responded office line and one of the extension lines.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings.

Figure 1:
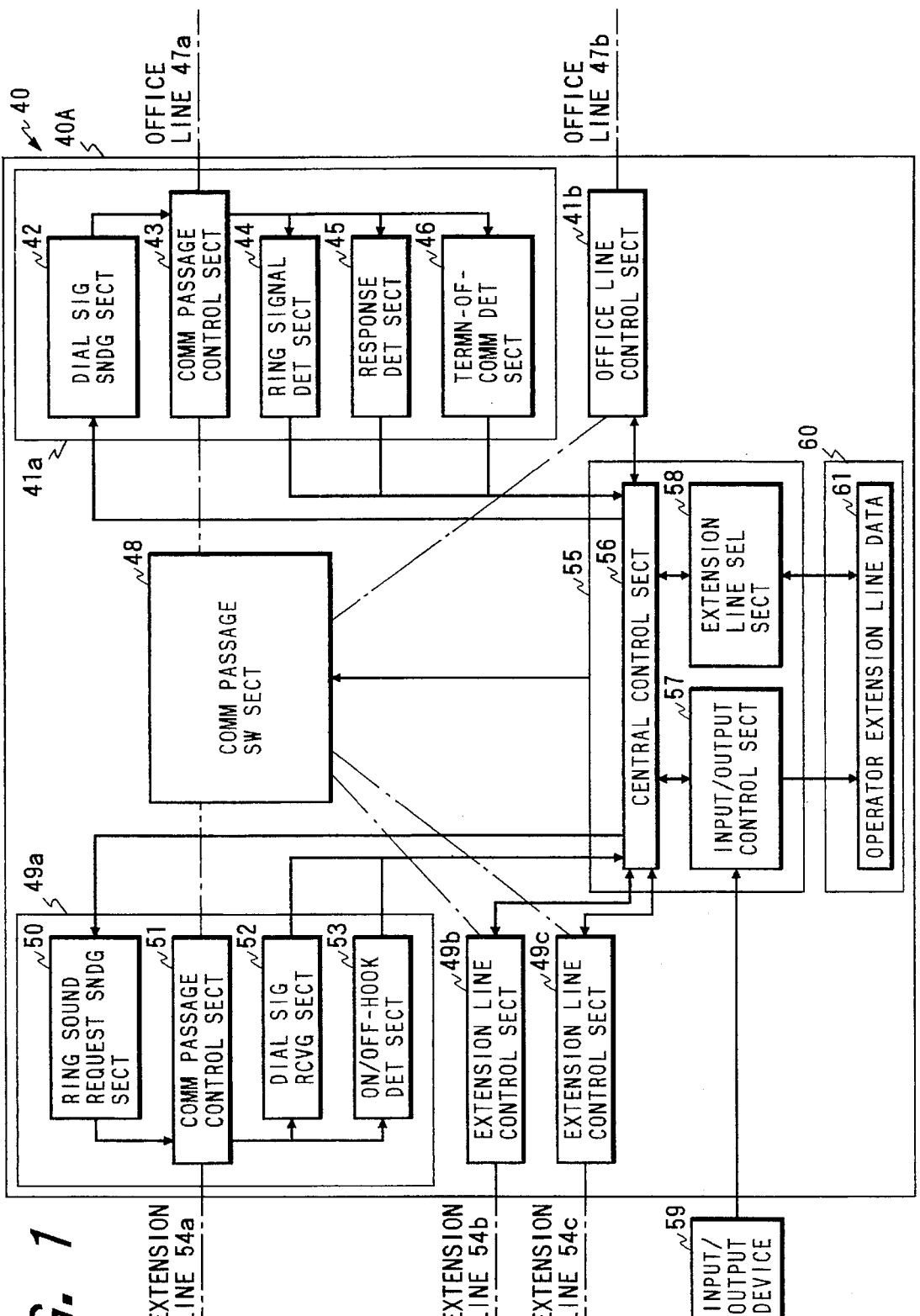
FIG. 1 is a block diagram showing an automatic private branch telephone exchange apparatus according to a preferred embodiment of the present invention.

FIG. 1 is a block diagram showing an automatic private branch telephone exchange apparatus 40 having a casing 40A, according to the preferred embodiment of the present invention.

In FIG. 1, numeral 55 denotes a main control section for controlling switching operations, such as, connection between extension lines 54a to 54c and office lines 47a and 47b, respectively, and between the extension lines mutually. The main control section includes a central control section 56 and an input/output control section 57 connected to a later-described input/output device 59. The input/output control section 57 analyzes data inputted from the input/output device 59 and executes communication with the central control section 56. The main control section 55 further includes an extension line selecting section 58 for determining one of the extension lines 54a to 54c to be connected to the office line in question.

Numeral 60 denotes a main storage section for storing data including managing data of the extension lines and the office lines and system managing data. The main storage section 60 includes operator extension line data 61 for identifying the extension lines in use for the operators. As will be described later, the operator extension line data 61 are fed from the input/output device 59.

The input/output device 59 is provided outside the casing 40A of the exchange apparatus 40 and connected, as described above, to the input/output control section 57. In the input/output device 59 are stored the foregoing operator extension line data in the form of extension numbers to be used for the telemarketing or the like, and telephone number data in the form of telephone numbers of a plurality of counter-parties, such as, customers to be called in the telemarketing. The input/output device 59 feeds these data to the input/output control section 57, which will be described later. Normally, a personal computer or the like is used as the input/output device 59, and an interface of RS-232C standard is used for communication with the input/output control section 57.

Symbol 41a denotes an office line control section connected to the office line 47a for communicating with the office line 47a. The office line control section 41a includes a communication passage control section 43 for establishing a communication passage to carry a sound signal, such as, a voice signal, from the office line 47a to a communication passage switching section 48 when communicating with one of the extension or intercommunication lines 54a to 54c. The office line control section 41a further includes a dial signal sending section 42 which, in response to a dialing command from the central control section 56, generates and sends out a dial signal into the office line 47a via the communication passage control section 43. The office line control section 41a further includes a ring signal detecting section 44 for detecting a ring signal sent from a telephone exchange through the office line 47a and through the communication passage control section 43 upon occurrence of a call from a calling party and for notifying the central control section 56 of arrival of the call. The office line control section 41a further includes a response detecting section 45 for detecting a polarity inversion of the office line 47a which is indicative of an occurrence of response by a called party, that is, offhooking of a telephone handset at a side of the called party, and for notifying the central control section 56 of the response by the called party. The office line control section 41a further includes a termination-of-communication detecting section 46 for detecting a termination-of-communication signal formed by a DC hit (short break) signal indicative of a termination of communication at the side of the counter-party, that is, on-hooking of the telephone handset at the side of the counter-party, and sent from the telephone exchange through the office line 47a and through the communication passage control section 43 and for notifying the central control section 56 of the termination of communication.

Symbol 41b represents an office line control section connected to the office line 47b. The office line control section 41b has the same structure as the foregoing office line control section 41a. Although only the two office line control sections 41a and 41b are shown for brevity of disclosure, further office line control sections are provided in practice.

Symbol 49a denotes an extension line control section connected to the extension line 54a for communicating with the extension line 54a. The extension line control section 49a includes a communication passage control section 51 connected to the extension line 54a for establishing a communication passage to carry a sound signal, such as, a voice signal, from the extension line 54a to the communication passage switching section 48 when communicating with one of the office lines 47a and 47b. The extension line control section 49a further Includes a ring sound request sending section 50 for sending a ring sound request signal, as commanded by the central control section 56 upon occurrence of a call to the extension line 54a, into the extension line 54a via the communication passage control section 51. The extension line control section 49a further includes a dial signal receiving section 52 for detecting a dial signal sent from an extension telephone set (not shown) connected to the extension line 54a through the communication passage control section 51 and for notifying the central control section 56 of the detected dial signal. The extension line control section 54a further includes an on/off-hook detecting section 53 for monitoring an off-hook signal sent from the extension telephone set through the communication passage control section 51 so as to notify the central control section 56 of on/off-hook information.

Symbols 49b and 49c represent extension line control sections connected to extension lines 54b and 54c, respectively. Each of the extension line control sections 49b and 49c has the same structure as the foregoing extension line control section 49a. Although only the three extension line control sections 49a to 49c are shown for brevity of disclosure, further extension line control sections are provided in practice.

The communication passage switching section 48 achieves connection, under the control of the central control section 56, between the extension line control sections 49a to 49c and the office line control sections 41a and 41b, respectively, and between the extension line control sections mutually.

An automatic calling operation of the private branch telephone exchange apparatus 40 having the foregoing structure will be described hereinbelow. Since the manual calling operation, that is, the calling based on the operator's action, is the same as that of the conventional private branch telephone exchange apparatus as described before, explanation thereof is omitted for brevity of disclosure.

Prior to starting the automatic calling operation, the operator inputs a command to the input/output device 59 to feed the stored operator extension line data to the input/output control section 57 of the main control section 55. Upon receipt of the operator extension line data at the input/output control section 57 from the input/output device 59, the central control section 56 controls the input/output control section to store the operator extension line data in the main storage section 60 as the operator extension line data 61.

Subsequently, when the operator sets the input/output device 59 to an automatic calling mode, the input/output device 59 outputs the stored customer telephone numbers one by one to the input/output control section 57. Upon receipt of one of the customer telephone numbers at the input/output control section 57 from the input/output device 59, the central control section 56 monitors the office line control sections 41a and 41b so as to detect one which is vacant or available, that is, not used. It is assumed that the office line control section 41a is vacant. The central control section 56 controls the available office line control section 41a to catch the office line 47a connected thereto, that is, to close a direct current loop to connect the office line 47a.

Subsequently, the central control section 56 sends dialing data indicative of the received customer telephone number to the dial signal sending section 42 of the office line control section 41a. In response to receipt of the dialing data, the dial signal sending section 42 executes calling to the office line 47a based on the received dialing data, that is, produces an office-line dial signal based on the received dialing data and sends it out into the office line 47a.

Thereafter, when the response detecting section 45 of the office line control section 41a detects a polarity inversion of the office line 47a, that is, a signal indicative of offhooking of the telephone handset at the side of the called party, a corresponding detection signal is sent to the central control section 56 from the response detecting section 45. In response to this detection signal, the central control section 56 feeds a command to the extension line selecting section 58 to find or select one of the extension lines which is vacant, that is, available for communication with the office line 47a. It is assumed that the extension line 54a is selected.

Subsequently, the central control section 56 feeds a command to the ring sound request sending section 50 of the extension line control section 49a connected to the selected extension line 54a, to send a ring sound request signal to an extension telephone set (not shown) via the extension line 54a. In response to this ring sound request signal, the extension telephone set produces ring sounds in sequence until the operator offhooks a handset of the extension telephone set. When the operator offhooks the telephone handset, a communication is stated between the office line 47a and the extension line 54a, that is, between the customer and the operator.

Figure 2:
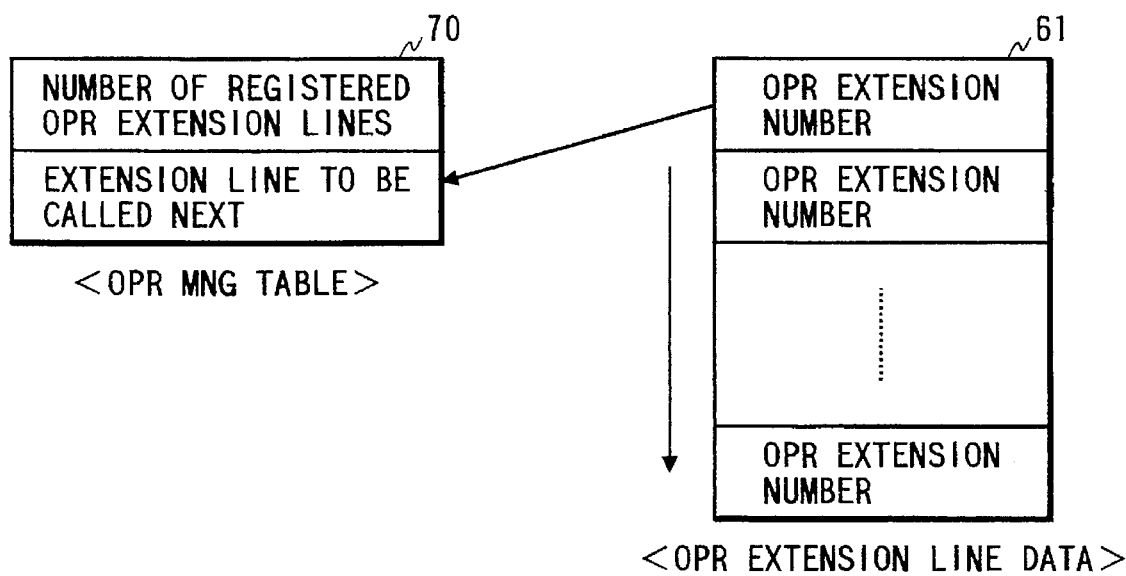
FIG. 2 is a diagram for explaining an operation of an extension line selecting section of a main control section of the automatic private branch telephone exchange apparatus.

Now, the operation of the main control section 55 of the automatic private branch telephone exchange apparatus 40 when performing the automatic calling to the office lines will be described in further detail with reference to FIGS. 2 and 3. FIG. 2 is a diagram for explaining an operation of the extension line selecting section 58 of the main control section 55, and FIG. 3 is a state transition diagram of the central control section 56 of the main control section 55 when performing the automatic calling to the office lines.

In FIG. 2, in response to the foregoing command of the central control section 56 to select one of the extension lines which is available for communication, the extension line selecting section 58 accesses the operator extension line data 61 stored in the main storage section 60 and reads out one by one in turn for checking whether or not the read one is vacant. The extension line selecting section 58 repeats this operation until vacant one is found. When the vacant one is found, it is indexed in an operator managing table 70 of the extension line selecting section 58 as an extension line to be called next.

Figure 3:
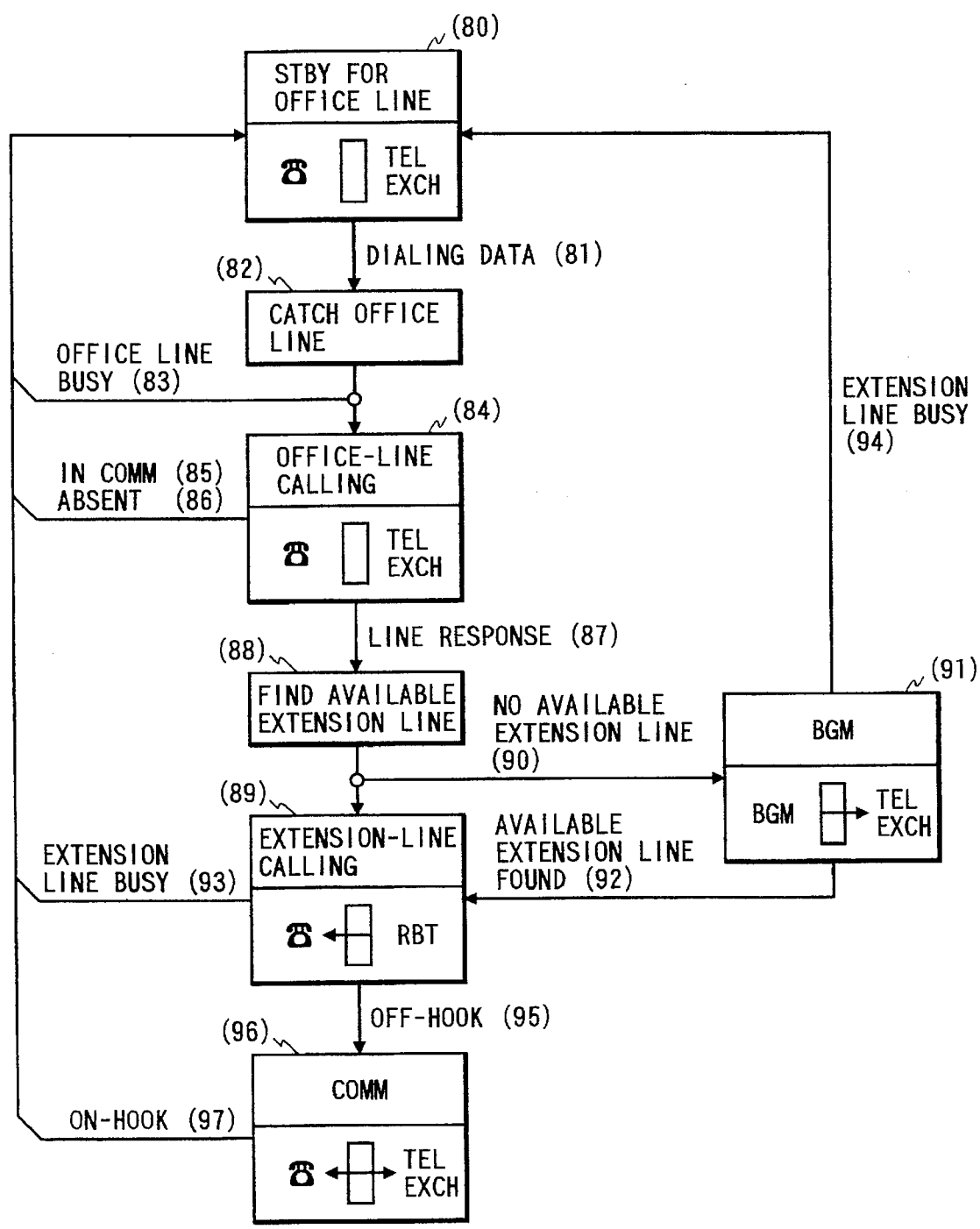
FIG. 3 is a state transition diagram of a main control section of the automatic private branch telephone exchange apparatus when performing automatic calling to office lines.
Figure 4:
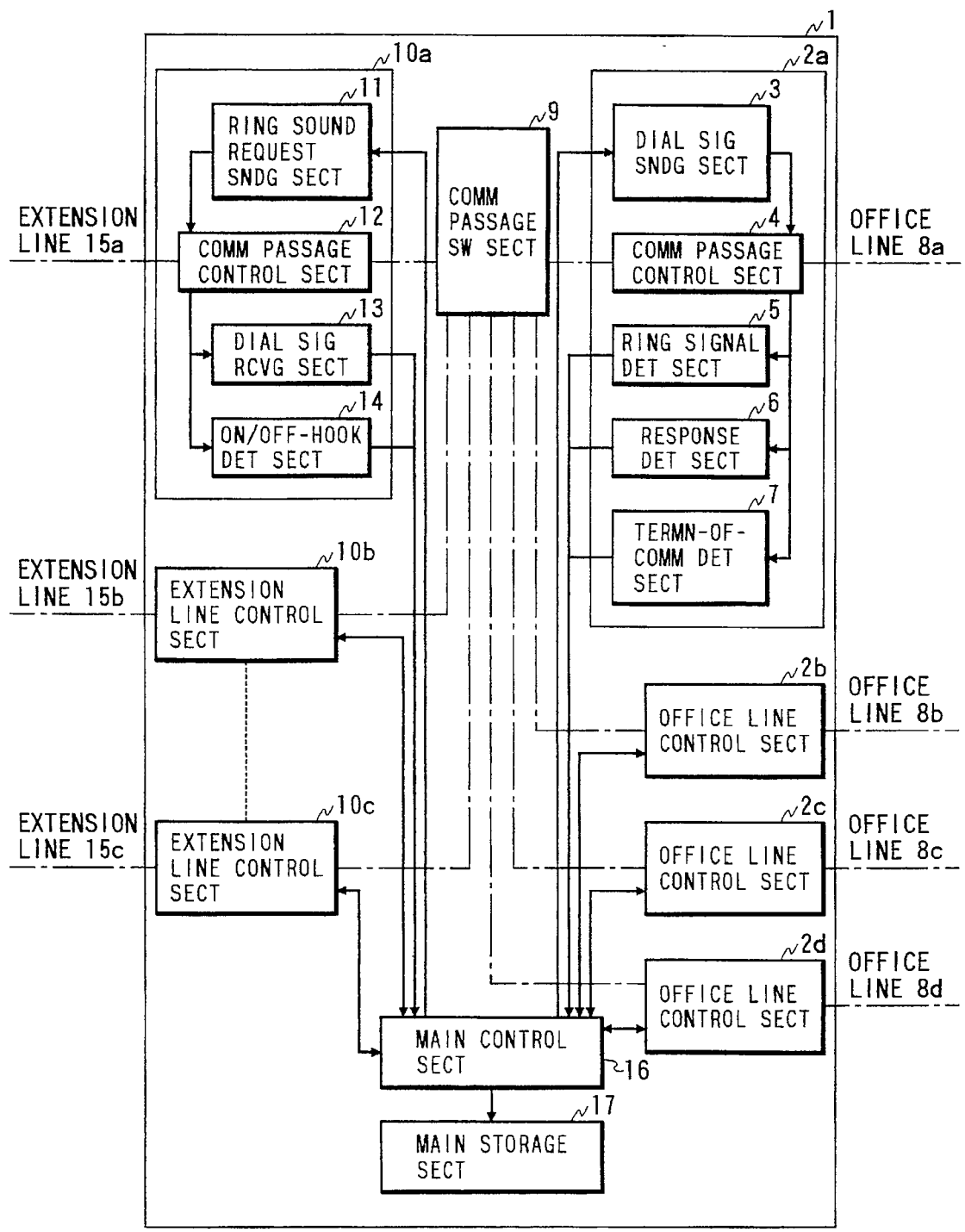
FIG. 4 is a block diagram showing a conventional automatic private branch telephone exchange apparatus.
Figure 5:
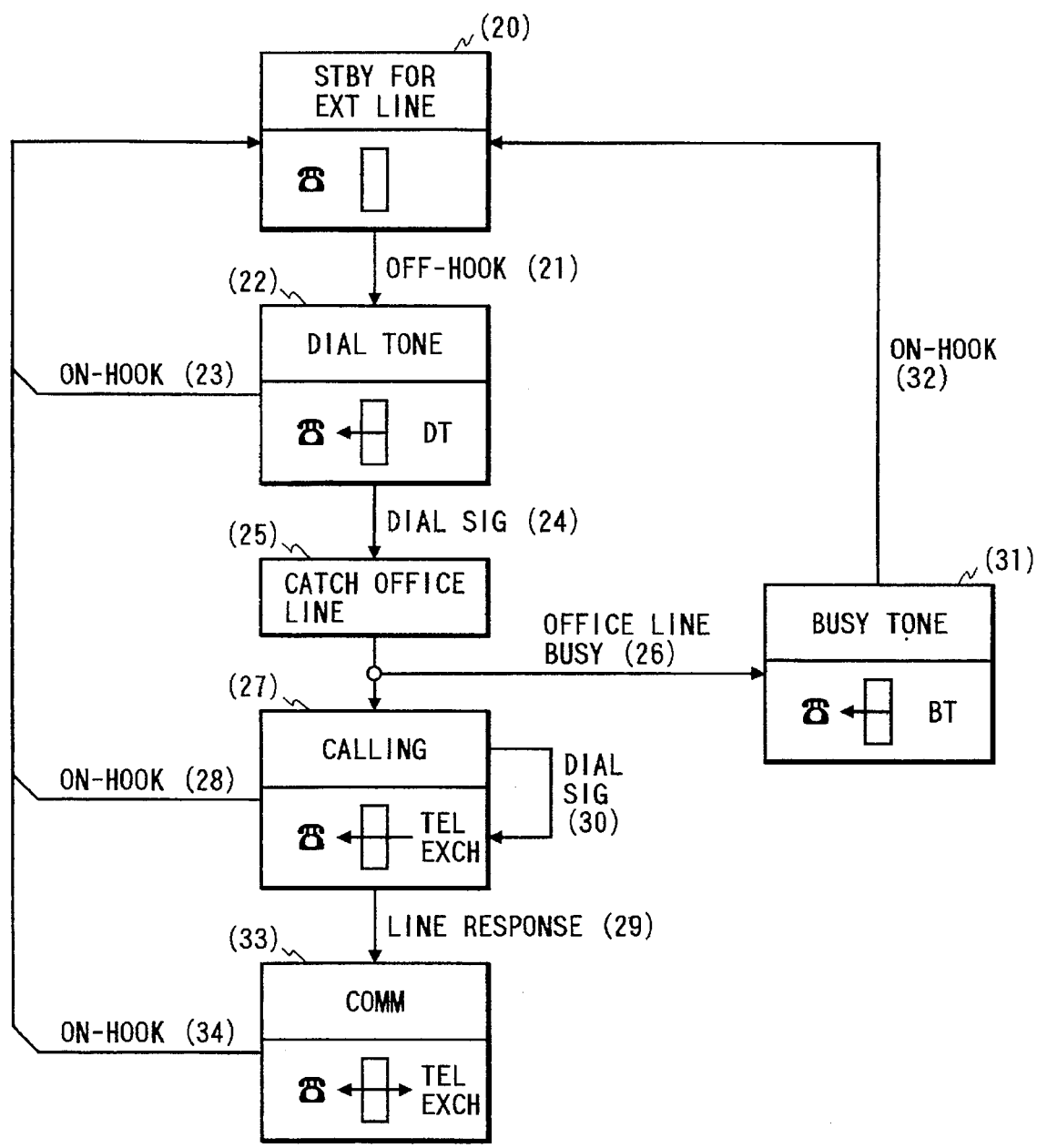
FIG. 5 is a state transition diagram of a main control section of the conventional automatic private branch telephone exchange apparatus when performing calling to office lines.

Referring now to FIG. 3, when dialing data (81) indicative of one customer telephone number is received from the input/output device 59 via the input/output control section 57 during an office-line stand-by state (80) which is for awaiting an off-hook signal sent through the office line, the central control section 56 monitors the office line control sections to find one which is vacant, and controls it to catch the corresponding office line (82), that is, to close the direct current loop to connect the corresponding office line.

When the office line is caught, the central control section 56 shifts to an office-line calling state (84) where the calling is executed to the caught office line, that is, the dialing data (81) is sent into the caught office line.

On the other hand, when none of the office lines are caught (83), that is, none of the office line control sections are available, the central control section 56 returns to the office-line stand-by state (80). In this case, the central control section 56 repeats monitoring the office line control sections to find one which is vacant as described above.

During the office-line calling state (84), if the off-hook signal is not detected by the response detecting section 45 within a given time period after the calling, that is, after the sending of the dialing data into the office line, the central control section 56 sends a signal indicative of connection failure or connection disablement to the input/output device 59 via the input/output control section 57 as determining that the called party is in communication with another (85) or the called party is absent (86), and then shifts to the office-line stand-by state (80) by opening the direct current loop to disconnect the office line. In this case, the input/output device 59 feeds a next customer telephone number to the central control section 56 via the input/output control section 57, and the central control section 56 repeats the foregoing procedure. It may be arranged that the central control section 56 sends the signal indicative of connection failure if the off-hook signal is not detected by the response detecting section 45 at a given number of times of ring back tones.

On the other hand, when the called party responds to the call (87), that is, the telephone handset is offhooked at the side of the called party, as detected via the response detecting section 45, the central control section 56 controls the extension line selecting section 58 to find the vacant or available extension line to be called next and index it in the operator managing table 70 as described before (88).

When the available extension line is found, the central control section 56 shifts to an extension-line calling state (89) where the central control section 56 commands the ring sound request sending section 50 to send the ring sound request signal into the indexed extension line.

On the other hand, when no available extension lines are found (90), the central control section 56 shifts to a BGM state (91) where the central control section 56 commands a message sending section (not shown) of the office line control section to send a message with background music into the responded office line via the communication passage control section 43. The message may be, for example, "One moment please. An operator will soon be connected". When any one of the extension lines becomes available (92) within a given time period during the BGM state (91), the central control section 56 shifts to the extension-line calling state (89). On the other hand, when no extension lines become available (94) within the given time period during the BGM state (91), the call is canceled, that is, the central control section 56 opens the direct current loop to disconnect the responded office line. In this case, an appropriate message may be sent into the responded office line to notify the called party that the call will be canceled.

During the extension-line calling state (89), when the off-hook signal is received (95) at the on/off-hook detecting section 53 through the indexed or called extension line, the central control section 56 shifts to a communication state (96) where the central control section 56 controls the communication passage switching section 48 to establish connection between this responded extension line and the foregoing responded office line so that a communication between the operator and the called party is made possible. On the other hand, when the off-hook signal is not received at the on/off-hook detecting section 53(93) during the extension-line calling state (89), the central control section 56 returns to the office-line stand-by state (80). Further, during the communication state (96), when the on-hook is detected at the on/off-hood detecting section 53 through the corresponding extension line (97), the central control section 56 returns to the office-line stand-by state (80).

As appreciated, according to the foregoing preferred embodiment, each operator is not bothered with other than the conversation with the called party so that the efficiency of the telemarketing is highly improved.

In the foregoing preferred embodiment, it is described that the personal computer or the like is used as the input/output device 59 and the interface of RS-232C standard is used for communication with the input/output control section 57. However, the present invention is not limited thereto. For example, a built-in input/output device may be used with an original-standard for communication with the input/output control section 57.

Further, in the foregoing preferred embodiment, one of the vacant extension lines is selected by the extension line selecting section 58 to be called and connected to the responded office line. On the other hand, it may also be arranged that the ring sound request signals are sent into all the available extension lines, and the responded office line is connected to the extension line which first carries the off-hook signal therethrough. In this case, it may also be arranged that priorities are assigned to the extension lines in advance, and when the off-hook signals are fed through a plurality of the extension lines, the responded office line is connected to the extension line of a higher priority.

While the present invention has been described in terms of the preferred embodiment, the invention is not to be limited thereto, but can be embodied in various ways without departing from the principle of the invention as defined in the appended claims.

What is claimed is:

1. A private branch telephone exchange apparatus comprising: an office line control section for controlling an office line:
   a communication passage switching section for connecting between the office line and an extension line; and
   a main control section for controlling said office line control section so as to perform automatic calling to the office line based on stored telephone numbers, said main control section, when said office line control section detects a signal indicative of a response to the calling sent through the office line, controlling said communication passage switching section to connect between the office line and the extension line;
   wherein said main control section monitors said office line control section upon performing said automatic calling to find whether the office line is available, wherein said main control section controls said office line control section to catch the office line when the office line is available, and wherein said main control section repeats monitoring said office line control section while the office line is non-available.

2. The private branch telephone exchange apparatus according to claim 1, wherein said response indicative signal is an off-hook signal.

3. The private branch telephone exchange apparatus according to claim 1, wherein said telephone numbers are stored in an output device which outputs them to said main control section.

4. The private branch telephone exchange apparatus according to claim 3, wherein said output device is a personal computer.

5. The private branch telephone exchange apparatus according to claim 4, wherein said telephone number is sent from said output device to said main control section via a standard communication protocol.

6. The private branch telephone exchange apparatus according to claim 3, wherein said output device outputs said stored telephone numbers one by one to said main control section.

7. The private branch telephone exchange apparatus according to claim 6, wherein said main control section monitors said office line control section upon receipt of each of said stored telephone numbers from said output device.

8. The private branch telephone exchange apparatus according to claim 1, wherein, when the extension line is not available upon detection of said response indicative signal by said office line control section, said main control section controls said office line control section to continue connecting the responded office line and controls said communication passage switching section to connect the responded office line to the extension line when the extension line becomes available.

9. The private branch telephone exchange apparatus according to claim 8, wherein said main control section controls said office line control section to send a given stand-by message into the responded office line while said office line control section continues connecting the responded office line during the extension line being non-available.

10. The private branch telephone exchange apparatus according to claim 1, wherein said main control section controls said office line control section to disconnect the office line when said response indicative signal is not detected within a given time period after the calling.

11. The private branch telephone exchange apparatus according to claim 1, wherein said main control section controls said office line control section to disconnect the office line when said response indicative signal is not detected at a given number of times of ring back tones.

12. A private branch telephone exchange apparatus comprising:
   office line control sections for controlling office lines, respectively;
   a communication passage switching section for connecting between one of said office lines and an extension line; and
   a main control section for controlling said office line control sections so as to perform automatic calling to the office lines based on stored telephone numbers, said main control section, when at least one of said office line control sections detects a signal indicative of a response to the calling sent through the corresponding office line, controlling said communication passage switching section to connect between the responded office line and the extension line;
   wherein said main control section monitors said office line control section upon performing said automatic calling to find whether at least one of the office lines is available, wherein said main control section controls the corresponding office line control section to catch the available office line, and wherein said main control section repeats monitoring of said office line control sections while none of the office lines are available.

13. The private branch telephone exchange appartus according to claim 12, wherein said response indicative signal is an off-hook signal.

14. The private branch telephone exchange apparatus according to claim 12, wherein said telephone numbers are stored in an output device which outputs them to said main control section.

15. The private branch telephone exchange apparatus according to claim 14, wherein said output device is a personal computer.

16. The private branch telephone exchange apparatus according to claim 15, wherein said telephone number is sent from said output device to said main control section via a standard communication protocol.

17. The private branch telephone exchange apparatus according to claim 14, wherein said output device outputs said stored telephone numbers one by one to said main control section.

18. The private branch telephone exchange apparatus according to claim 17, wherein said main control section monitors said office line control sections upon receipt of each of said stored telephone numbers from said output device.

19. The private branch telephone exchange apparatus according to claim 12, wherein, when the extension line is not available upon detection of said response indicative signal by said office line control section, said main control section controls said office line control section to continue connecting said responded office line and controls said communication passage switching section to connect said responded office line to the extension line when the extension line becomes available.

20. The private branch telephone exchange apparatus according to claim 19, wherein said main control section controls said office line control section to send a given stand-by message into said responded office line while said office line control section continues connecting said responded office line during the extension line being non-available.

21. The private branch telephone exchange apparatus according to claim 12, wherein said main control section controls said office line control section to disconnect the corresponding office line when said response indicative signal is not detected within a given time period after the calling.

22. The private branch telephone exchange apparatus according to claim 12, wherein said main control section controls said office line control section to disconnect the corresponding office line when said response indicative signal is not detected at a given number of times of ring back tones.

23. A private branch telephone exchange apparatus comprising:

office line control sections for controlling office lines, respectively;

extension line control sections for controlling extension lines, respectively;

a communication passage switching section for connecting between said office lines and said extension lines, respectively; and a main control section for controlling said office line control sections so as to perform automatic calling to the office lines based on stored telephone numbers, said main control section, when at least one of said office line control sections detects a signal indicative of a response to the calling sent through the corresponding office line, controlling said communication passage switching section to connect between the responded office line and one of said extension lines;

wherein said main control section monitors said office line control section upon performing said automatic calling to find whether at least one of the office lines is available, wherein said main control section controls the corresponding office line control section to catch the available office line, and wherein said main control section repeats monitoring of said office line control sections While none of the office lines are available.

24. The private branch telephone exchange apparatus according to claim 23, wherein said response indicative signal is an off-hook signal.

25. The private branch telephone exchange apparatus according to claim 23, wherein said telephone numbers are stored in an output device which outputs them to said main control section.

26. The private branch telephone exchange apparatus according to claim 25, wherein said output device is a personal computer.

27. The private branch telephone exchange apparatus according to claim 26, wherein said telephone number is sent from said output device to said main control section via a standard communication protocol.

28. The private branch telephone exchange apparatus according to claim 25 wherein said output device outputs said stored telephone numbers one by one to said main control section.

29. The private branch telephone exchange apparatus according to claim 28, wherein said main control section monitors said office line control sections upon receipt of each of said stored telephone numbers from said output device.

30. The private branch telephone exchange apparatus according to claim 23, wherein, when none of said extension lines are available upon detection of said response indicative signal by said office line control section, said main control section controls said office line control section to continue connecting said responded office line and controls said communication passage switching section to connect said responded office line to one of said extension lines which becomes available.

31. The private branch telephone exchange apparatus according to claim 30, wherein said main control section controls said office line control section to send a given stand-by message into said responded office line while the said office line control section continues connecting said responded office line during none of said extension lines being available.

32. The private branch telephone exchange apparatus according to claim 23, wherein said main control section controls said office line control section to disconnect the corresponding office line when said response indicative signal is not detected within a given time period after the calling.

33. The private branch telephone exchange apparatus according to claim 23, wherein said main control section controls said office line control section to disconnect the corresponding office line when said response indicative signal is not detected at a given number of times of ring back tones.

* * * * *